June 8, 1954    J. R. BENDLER    2,680,446
AUTOMATIC DEVICE AND INSTALLATION FOR
THE CONTROL OF BATH CONCENTRATION
Filed June 22, 1951    2 Sheets-Sheet 1
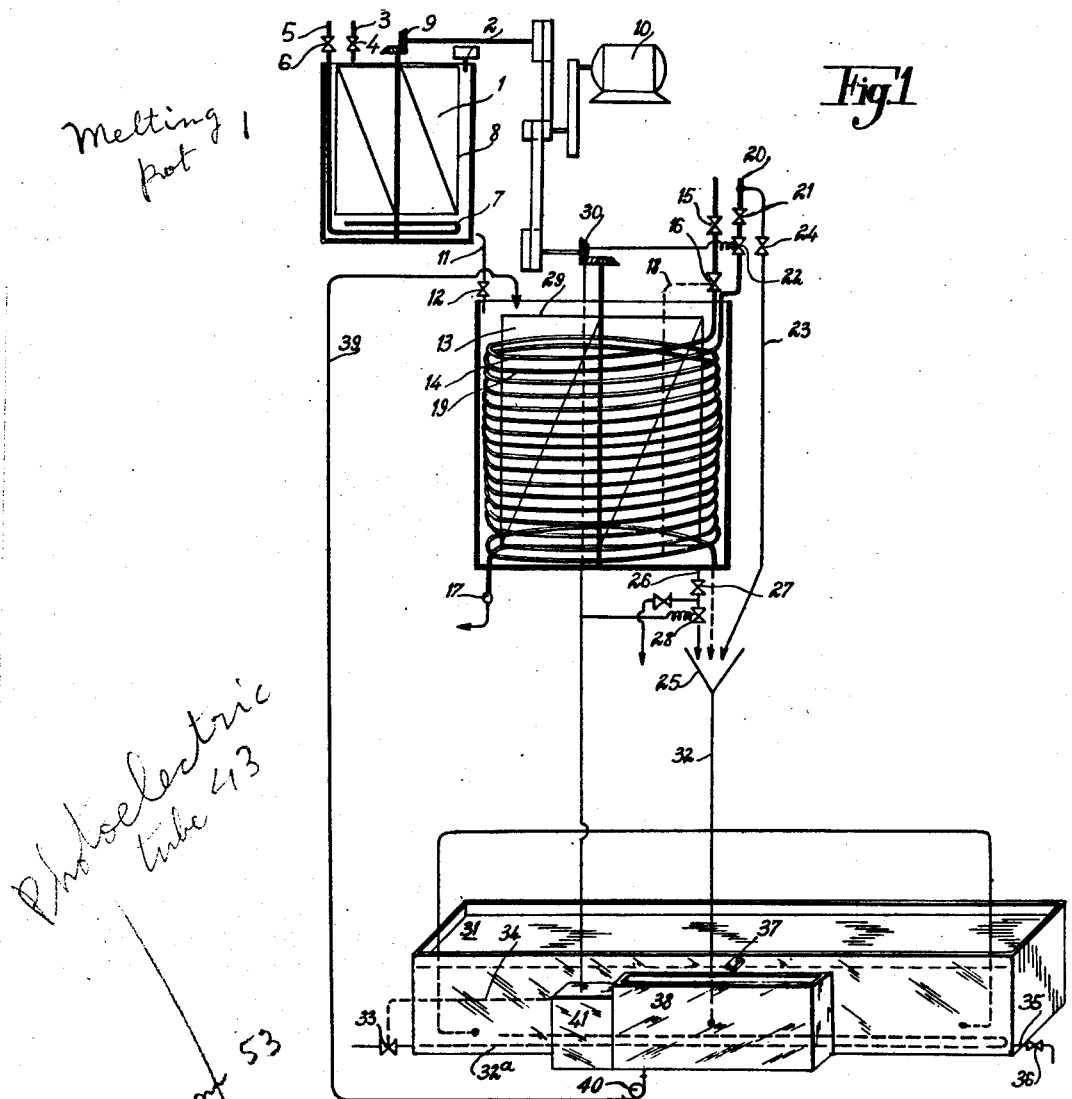
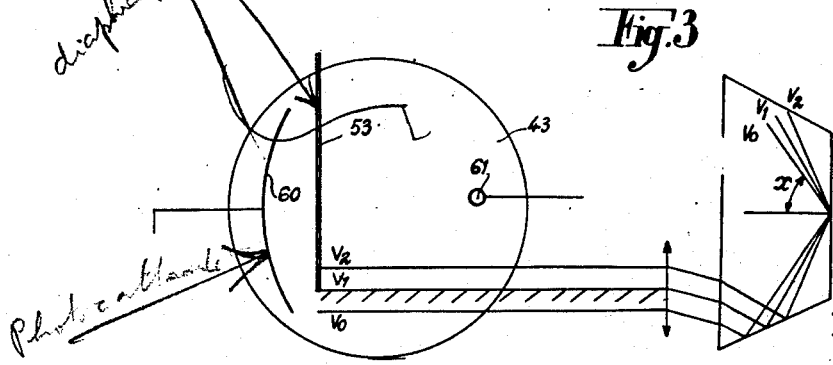
Inventor
Jean Robert Bendler
By Robert E. Burns
Attorney

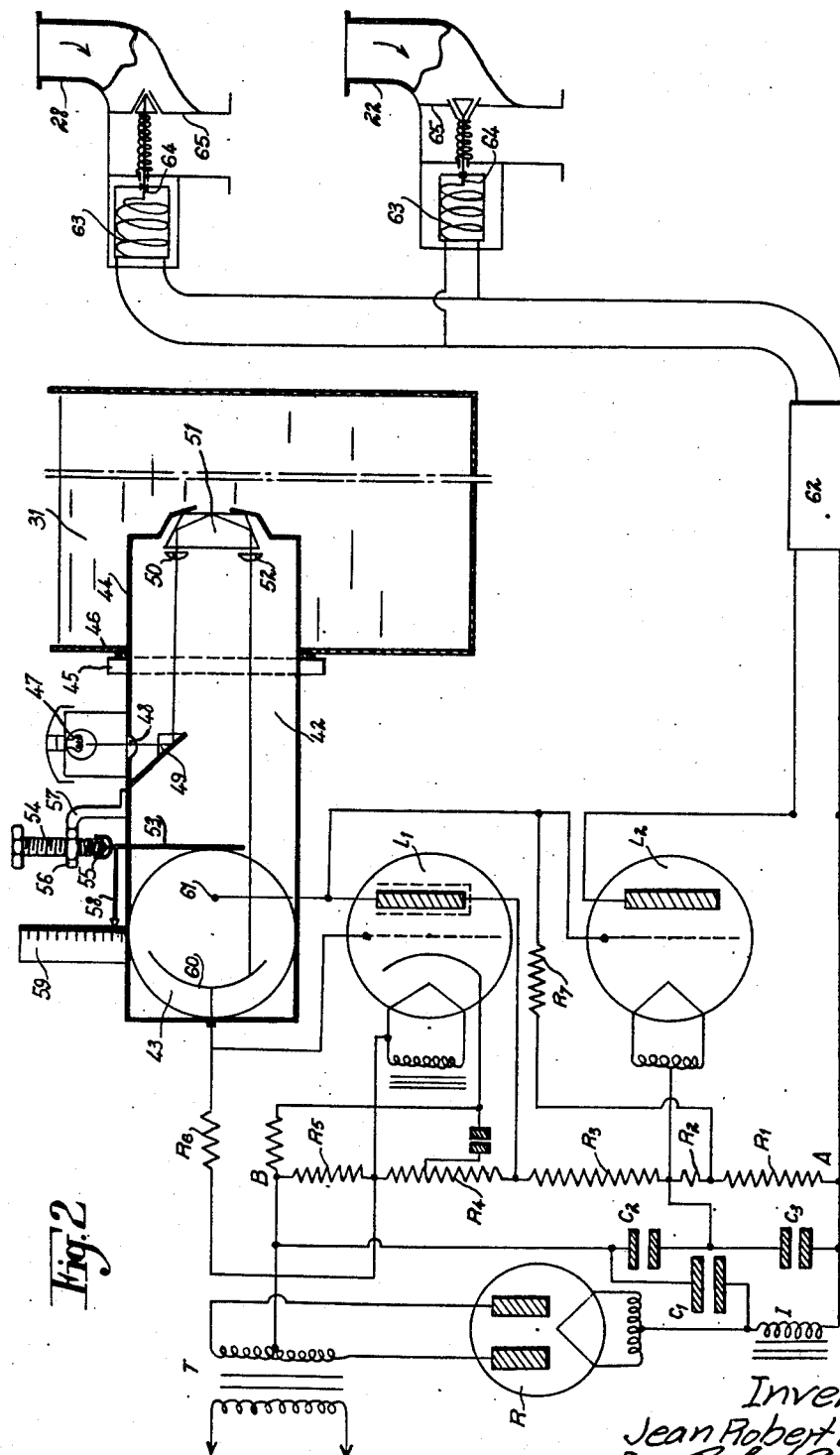

Patented June 8, 1954

2,680,446

UNITED STATES PATENT OFFICE 2,680,446

AUTOMATIC DEVICE AND INSTALLATION FOR THE CONTROL OF BATH CONCENTRATION

Jean Robert Bendler, Corbeil, France, assignor to L'Impregnation, Corbeil, France, a French body corporate Application June 22, 1951, Serial No. 232,984

Claims priority, application France June 28, 1950

6 Claims. (Cl. 137—93)

The present invention has for its object to provide an automatic device for the obtainment and maintenance of a predetermined concentration in baths, such as glue baths for the sizing of cloth, concentration baths for sugars, jams, fruit juices etc. and more generally any liquid or juice the index of refraction of which indicates the dry product content.

It is known to use a refractometer for determining the concentration of a juice, the concentration being a function of the index of refraction, and to manually control the concentration as a function of the indications shown on the apparatus until the reading corresponds to the desired concentration.

The invention has for its object to provide a device to control automatically the bath concentration as a function of the indications from refracting means.

Said device comprises in combination: refracting means of a pre-determined refracting index, a source of light adapted to direct a flux of light onto the solution the concentration of which is to be measured and through said refracting means, a photo-electric element adapted to receive the beam of light issuing from said refracting means to convert the incoming light energy into an electric current of an intensity depending on the refracting index of the solution, means for adjusting the amount of light impinging on said photoelectric element for a solution of a pre-determined concentration, control means for altering the concentration of said solution, and electrically responsive means supplied with the current from said photo-electric element for actuating said control means.

The invention has also for its object the various installations having a regulating device of the above mentioned improved type.

The description to follow will assist the understanding of the invention. An embodiment of the invention adapted for the obtainment of a glue of a given concentration will be described, this example is of course in no way limitative and is given only to bring out the features of the invention.

In the accompanying drawings:

Fig. 1 is a diagrammatic view of an embodiment of an installation in accordance with the invention;

Fig. 2 is a more detailed diagrammatic view of an automatic concentration regulating device.

Fig. 3 is a working diagram of a refractometer combined with the light sensitive device.

In the illustrated embodiment the installation specifically adapted for the obtainment of a glue of a given concentration includes a glue melting pot 1. This pot 1 has a supply pipe 2 for the amylaceous material, a water supply 3 controlled by a valve 4, and a direct steam supply 5, controlled by a valve 6, and feeding the pot through a ring 7.

An agitator 8 is provided for the mixing. Said agitator 8 is driven through a transmission 9 by an electric motor 10.

The melting pot 1 is provided with a drain pipe 11, controlled by a valve 12, discharging into a storage vat 13. This storage vat 13 has a heating device consisting in a coil 14 that is supplied with steam under pressure through a stop valve 15, a regulating valve 16 and a drain cock 17 controlled by a thermostat 18.

The vat 13 has a second coil 19 that is supplied with cold water from pipe 20 controlled by a stop valve 21 and an electric valve 22. A branch pipe 23 from pipe 20, controlled by valve 24, enables the funnel 25 to be supplied with water without passing this water through the vat 13.

Discharging into this funnel 25 is the water coil 19 and the drain pipe 26 from the vat 13, this drain pipe has a stop valve 27 and an electrically operated valve 28.

A mixing agitator 29 is provided in the storage vat 13 driven by the motor 10 through transmission 30.

The funnel 25 is connected to a utilization tank 31 through a pipe 32 feeding the tank at three points.

Said tank 31 is provided with heating means such as a direct steam rim 32ª, controlled by a valve 33 working off a thermostat 34.

The utilization tank 31 is provided with a drain pipe 35 controlled by a valve 36 and an overflow 37 discharging into an adjacent tank 38. The adjacent tank 38 is connected to the storage vat 13 through a return pipe 39 and a gear pump 40.

An electro-optic concentration regulating device 41 is mounted on the utilization tank 31. This electro-optic device 41 (Fig. 2) is composed of a refractometer 42 combined with a light sensitive device such as a photoelectric cell 43.

The refractometer is of the type having a refracting element limited by a plane surface in contact with the solution, a light source adapted to direct light towards said surface whereby said light is partly refracted through the solution and partly reflected as a beam of light in an amount depending upon the concentration of the solution.

The photoelectric cell 43 is of a standard type, for example a caesium cell.

According to an embodiment (Fig. 2), the photo-electric cell 43 and the refractometer 42 are housed in the same tight case 44, fixed to the utilization tank 31 wall by means of a flange 45 and a joint 46. A part of this case 44 penetrates the interior of the tank 31 and is thus immersed in the liquid.

The refractometer device housed in the case is composed of a light source, the light beam from which is directed by an optic system onto the face of a prism immersed in the liquid the light beam reflected by total reflection off the liquid being caught by an optic system which throws a beam of light on the photo-electric cell.

The light source is constituted by a vertical electric bulb 47 situated at the focal point of a horizontal lens 48. The parallel light beam from the lens 48 is reflected at 90° by any suitable device, for example a total reflecting prism 49. A vertical lens 50 receives this beam and forms an image of the source 47 on the base of a trapezoidal prism 51 that has a large index of refraction and is set in the end of the case 44 and in contact by the small base with the liquid in the tank 31.

The light beam is reflected first by a side of the trapezoidal prism 51; a part of it is transmitted across the liquid, the other part is reflected off the liquid and after reflection off the second side of the prism is caught by a lens 52 which throws a beam of light on the photo-electric cell 43.

In the case 44 in front of the photo-electric cell 43 is mounted a diaphragm 53 vertically slidable by means of an adjusting screw 54 which is connected to it by a ball joint 55. This adjusting screw 54 is screwed into a nut 56 secured to the case 44 by a bracket 57. The vertical position of the diaphragm 53 is indicated by a horizontal pointer 58 that is secured to the diaphragm 53 and moves before a graduated scale 59 carried by the case 44. The photo-electric cell 43 is inserted in a normal amplification circuit.

As an example, the Loftyn-White layout has been shown.

This layout has two amplification stages. The first is produced by a screen grid valve $L_1$, the second by a triode $L_2$. The cathode 60 of the cell is connected to the grid of the first valve $L_1$, the anode 61 to the plate of this valve.

The two terminals of the cell are connected to a direct current. This current is provided from the secondary winding of a transformer T, rectified by a valve R and filtered by the inductance I and the capacitors $C_1C_2C_3$. Thus at the two terminals A (+ pole) B (− pole) there is obtained a direct voltage from a potentiometer created by five resistances in series $R_1R_2R_3R_4R_5$. The various elements (filament, grid) of the valve $L_1$, $L_2$ are connected at points on the potentiometer appropriate to their voltage.

The cathode 60 of the cell 43 is connected to the junction point of the two resistances $R_4R_5$ through a shock resistance $R_6$. The anode 61 to the junction point of resistances $R_1R_2$ through a shock resistance $R_7$.

The plate of the valve $L_2$ and the point A are connected to a known type of power relay 62. The current leaving the power-relay feeds through two branch lines the two electrically operated valves 22, 28.

These two electrically operated valves 22, 28 of a known type are shown diagrammatically in Fig. 2. They are composed of an electric magnet 63 adapted to attract, when fed by the current from the relay 62, a plunger 64 that forms a valve with a fixed valve seating 65 of the electrically operated valve. According to the embodiment shown, the valve 22 closes when supplied with current and valve 28 opens.

The working of the embodiment is as follows:

The refractometer 42 supplies in the prism 51 a luminous zone clearly defined from but adjacent to a dark zone, the line of separation between these two zones corresponds to the position of a ray from the light source that strikes the small base of the prism at the critical angle X (Fig. 3) and is totally reflected; the luminous zone is created by the rays that have struck the small base of the prism at an angle of incidence greater than this critical angle and have been reflected, the darker zone is due to the fact that the rays from the light source that strike the small base of the prism at an angle of incidence less than the critical angle pass through the liquid and undergo only very slight reflection.

The critical angle X is given by the standard formula:

$$\sin X = \frac{n_2}{n_1}$$

where $n_1$ is the absolute index of refraction of the glass of the prism, $n_2$ that of the liquid. The index $n_2$ at a constant temperature is a function of the concentration C of the liquid, hence: $n_2 = kC$ from which $$\sin X = \frac{kC}{n_1}$$

It is seen then that the critical angle increases with the concentration.

In Fig. 3, three rays $V_0$, $V_1$ $V_2$ strike the base of the prism in contact with the liquid at the critical angles X for the concentrations $C_0$, $C_1$, $C_2$ such that $C_0 < C_1 < C_2$. After reflection off the small base of the prism, then off the corresponding small side that reverses their respective positions, these rays are in the order from top to bottom $V_2$, $V_1$, $V_0$. Now, assuming a concentration $C_1$ exists in the bath, the zone above ray $V_1$ will be luminous and the zone below $V_1$ will be darker. It is obvious from the foregoing that the line of separation between the luminous zone and the darker zone will rise with an increase in the concentration of the bath.

It is, then, possible to regulate empirically the height of the diaphragm 53 by means of the screw 54, such that the lower edge of the diaphragm coincides with the line of separation of the two zones for a desired bath concentration, for example $C_1$ (ray $V_1$).

All rays directed towards the cell that lie above the ray $V_1$ will be masked by the diaphragm, but all rays that pass below the level of ray $V_1$ will be uninterrupted and will impinge on the photo-electric cell.

The diaphragm in front of the photo-electric cell being, then, adjusted for a bath concentration of $C_1$ for example, the installation is ready to operate.

The melting pot 1 is fed with water and amylaceous material in such a way as to produce a glue the concentration of which is 30–50% higher than the utilization concentration which varies from 0 to 15%. For example 22 kg. of amylaceous material may be charged for 100 kg. of water if the utilization concentration has to be 15%.

This glue discharges through the drain pipe 11 into the storage vat 13 where it is maintained at a constant temperature $t_0$ by the thermostat 18 controlling the steam passing through the coil 14.

It will be noted that the water that passes through the coil 19 heats in this coil to a temperature substantially equal to $t_0$.

The utilization tank 31 being empty and the index of refraction of air being less than the pre-determined concentration, the luminous zone is below the diaphragm 53, and the cell 43 is illuminated and the electrically operated valves 22, 28 are energized. The glue valve 28 is then opened, the water valve 22 closed. When the glue reaches the height of the refractometer 42, its concentration, $C_2$ for example, being 50% higher than the desired concentration $C_1$ and the luminous zone being masked by the diaphragm 53, the cell 43 is no longer affected and the current supply to the electrically operated valves 22, 28 is cut off. The glue valve 28 closes, the water valve 22 opens, the index of refraction decreases and the luminous zone moves from the top towards the bottom and at the moment when the concentration to which the diaphragm is set is attained, the cell is again affected by the luminous zone; the glue valve 28 opens, the water valve 22 closes and the mechanism recommences. A stable equilibrium is then maintained, the glue being at the concentration $C_1$, and any accidental variation in this equilibrium is immediately counterbalanced by the regulating device.

Needless to say, the glue temperature in the utilization tank 31 is kept constant at a value $t_0$ by the thermostat 34 controlling the direct steam supply valve 33, for the index of refraction varies very rapidly with the temperature change.

It will be noticed that the branch pipe 23, by feeding water directly to the funnel 25, permits the cleaning of the utilization tank when necessary.

Of course, the invention is not limited to the embodiments described and shown in the drawings, which have only been given by way of example.

In particular, the electrically operated valve could be replaced by valves operated by reversible variable speed motors.

Having now described my invention what I claim as new and desire to secure by Letters Patent is:

1. In an installation for the preparation of a bath of a solution of a product in a solvent, the provision for the automatic obtainment and maintenance of a pre-determined concentration of said bath solution of a combination comprising: a receiving vessel for said bath, a first pipe for the supply to said vessel of a solution at a concentration higher than said pre-determined concentration, an electrically operated valve in said pipe, a second pipe for the supply to said vessel of the solvent, an electrically operated valve in said pipe, a refractometer having a refracting element limited by a plane surface in contact with the solution, the concentration of which is to be controlled, a light source adapted to direct light towards said surface whereby said light is partly refracted through the solution and partly reflected as a beam of light without passing through the solution, the position of said reflected beam of light depending upon the concentration of the solution, a photo-electric element adapted to receive the reflected beam of light to convert the incoming light energy into an electric current, a diaphragm interposed between said refractive means and said photo-electric element, said diaphragm being slidably mounted in front of said photo-electric element for adjusting the amount of light impinging on said photo-electric element for a solution of a pre-determined concentration, said electrically operated valves in said first and second pipes selectively actuated by electrically responsive means supplied with the current from said photo-electric element.

2. In a device for the obtainment and maintenance of a pre-determined concentration of a bath solution, the index of refraction of which indicates the composition, in combination: a refractometer, said refractometer comprising a casing, a prism closing said casing at one end and adapted to be in contact by its external plane face with the solution, the concentration of which is to be controlled, a light source in said casing adapted to direct light towards said prism, whereby said light is partly refracted through the prism and the solution and partly reflected on the prism without passing through the solution, the position of said reflected beam of light depending upon the concentration of the solution, a photo-electric element in said casing adapted to receive the reflected beam of light to convert the incoming light energy into an electric current, means in said casing for adjusting the amount of light of the reflected beam impinging on said photo-electric element for a solution of a predetermined concentration, and electrically responsive means supplied with the current from said photo-electric element for altering the concentration of said solution, when it varies from said predetermined concentration.

3. In a device for the obtainment and maintenance of a predetermined concentration of a bath solution, the index of refraction of which indicates the composition, in combination: a refractometer, said refractometer comprising a casing, a prism closing said casing at one end and adapted to be in contact by its external plane face with the solution, the concentration of which is to be controlled, a light source in said casing adapted to direct light towards said prism, whereby said light is partly refracted through the prism and the solution and partly reflected on the prism without passing through the solution, the position of said reflected beam of light depending upon the concentration of the solution, a photo-electric element in said casing adapted to receive the reflected beam of light to convert the incoming light energy into an electric current, a diaphragm interposed in said casing between said prism and said photo-electric element, said diaphragm being slidably mounted in front of said photo-electric element.

4. In an installation for the preparation of a bath of a solution of a product in a solvent, the provision for the automatic obtainment and maintenance of a predetermined concentration of said bath solution of a combination comprising: a receiving vessel for said bath, a first pipe for the supply to said vessel of a solution at a concentration higher than said predetermined concentration, an electrically operated valve in said pipe, a second pipe for the supply to said vessel of the solvent, an electrically operated valve in said pipe, a refractometer, said refractometer comprising a casing, a prism closing said casing at one end and adapted to be in contact by its external plane face with the solution, the concentration of which is to be controlled, a light source in said casing adapted to direct light towards said prism, whereby said light is partly refracted through the prism and the solution and partly reflected on the prism without passing through the solution, the position of said reflected beam of light depending upon the concentration of the solution, a photo-electric element in said casing adapted to receive the reflected beam of light to convert the incoming light energy into an electric current, means in said casing for adjusting the amount of light of the reflected beam impinging on said photo-electric element for a solution of a predetermined concentration, said electrically opereated valves in said first and second pipes being selectively actuated by electrically responsive means supplied with the current from said photo-electric element.

5. In an installation for the preparation of a bath of a solution of a product in a solvent, the provision for the automatic obtainment and maintenance of a predetermined concentration of said bath solution of a combination comprising: a receiving vessel for said bath, thermostatic means in said bath for maintaining a substantially constant temperature, a first pipe for the supply to said vessel of a solution at a concentration higher than said predetermined concentration, an electrically operated valve in said pipe, a second pipe for the supply to said vessel of the solvent, an electrically operated valve in said pipe, a refractometer, said refractometer comprising a casing, a prism closing said casing at one end and adapted to be in contact by its external place face with the solution, the concentration of which is to be controlled; a light source in said casing adapted to direct light towards said prism, whereby said light is partly refracted through the prism and the solution and partly reflected on the prism without passing through the solution, the position of said reflected beam of light depending upon the concentration of the solution, a photo-electric element in said casing adapted to receive the reflected beam of light to convert the incoming light energy into an electric current, a diaphragm interposed in said casing between said prism and said photo-electric element, said diaphragm being slidably mounted in front of said photo-electric element, said electrically operated valves in said first and second pipes being adapted to operate in reverse directions when actuated by electrically responsive means supplied with the current from said photo-electric element.

6. In an installation for the preparation of a bath of water-glue solution the provision for the automatic obtainment and maintenance of a predetermined concentration of said glue solution of the combination comprising: a melting down pot for the glue at a concentration higher than said predetermined concentration, a storage vat supplied by said melting down pot, heating means in said storage vat, thermostatic means controlling said heating means to maintain a substantially constant temperature of said glue solution, an utilization tank, a first pipe connecting said storage vat to said utilization tank, an electrically operated valve in said first pipe, a second pipe supplying said utilization tank with water, an electrically operated valve in said pipe, thermostatic means in said utilization tank for maintaining a temperature substantially equal to that in the storage vat, a refractometer having a refracting element limited by a plane surface in contact with said glue solution, a light source adapted to direct light towards said surface, whereby said light is partly refracted through said solution and partly reflected as a beam of light without passing through the solution, the position of said reflected beam of light depending upon the concentration of said glue solution, a photo-electric element adapted to receive the reflected beam of light to convert the incoming light energy into an electric current, a diaphragm interposed between said refracting means and said photo-electric element, said diaphragm being slidably mounted in front of said photo-electric element for adjusting the amount of light impinging on said photo-electric element for a solution of a predetermined concentration, said electrically operated valves in said first and second pipes being adapted to operate in reverse directions when actuated by electrically responsive means supplied with the current from said photo-electric element.

References Cited in the file of this patent

UNITED STATES PATENTS

| Number | Name | Date |
|---|---|---|
| 1,471,342 | Logan | Oct. 23, 1923 |
| 1,909,469 | Hubbard | May 16, 1933 |
| 2,262,573 | Bender | Nov. 11, 1941 |
| 2,394,129 | West | Feb. 5, 1946 |